United States Patent [19]
Arbisi

[11] Patent Number: 5,203,993
[45] Date of Patent: Apr. 20, 1993

[54] METHOD AND APPARATUS FOR REMOVING SALT FROM SEA WATER

[75] Inventor: Dominic S. Arbisi, Minnetonka, Minn.

[73] Assignee: Electrostat Technologies, Inc., Minnetonka, Minn.

[21] Appl. No.: 783,926

[22] Filed: Oct. 29, 1991

[51] Int. Cl.⁵ .............................................. C02F 1/48
[52] U.S. Cl. .................... 210/221.1; 210/243; 210/748; 210/652; 203/49; 159/16.1; 202/201; 55/10
[58] Field of Search ............. 210/748, 243, 221.1, 210/221.2, 652; 203/49; 159/16.1; 202/201; 55/10

[56] References Cited
U.S. PATENT DOCUMENTS 3,491,822  1/1970  Ramaswami et al. ............. 159/16.1
4,624,791  11/1986  Ferriss ................................ 210/221.2
4,662,902  1/1987  Meyer-Pittroff ..................... 55/122

Primary Examiner—Bernard Nozick
Attorney, Agent, or Firm—John W. Adams

[57] ABSTRACT

A method and apparatus for removing substantial portions of the saline content in salt water by passing air bubbles through the salt water in a tank to produce droplets having substantially reduced salt content and collecting said reduced salt droplets in a collection tank.

10 Claims, 2 Drawing Sheets

METHOD AND APPARATUS FOR REMOVING SALT FROM SEA WATER

BACKGROUND OF THE INVENTION

In the past a number of different methods have been used for removing salt from sea water to produce substantially salt-free water supplies. A number of these procedural mechanisms are disclosed in U.S. Pat. Nos. 4,121,977 issued Oct. 24, 1978 to CARSON; 4,135,985 issued Jan. 23, 1979 to LAROCCA; 4,235,680 issued Nov. 25, 1980 to DIGGS; 4,270,981 issued Jun. 2, 1981 to STARK. These prior art systems require a great deal of energy and have not proved to be cost effective.

SUMMARY OF THE INVENTION

The present invention simulates a natural process by providing a method and apparatus for removing salt from sea water and perhaps other fluids and includes discharging air bubbles into the bottom of a tank containing water having an undesirable quantity of salt therein. As the air bubbles are formed in the salt water, the air is encapsulated within a film and they travel upward through the salt water. These bubbles rupture as they pass through the water surface. Each bubble collapses and forms a series of water droplets which are produced by the rupturing of the thin liquid film surrounding each bubble. This rupturing process generates a vertical water jet that rises from the cavity produced in the surface of the salt water by the collapsing bubble. Two droplet families are produced, one can be called a "film drop" and the other a "jet drop". Both droplets are capable of being transported across the water/air interface at the surface of the salt water contained in the tank. An electrical charge is induced on these droplets during the collapsing of the bubbles. This charged droplet is accelerated through an electrostatic field established by a grid spaced slightly above the surface of the salt water supply. The upwardly moving charged droplets in the plenum chamber are positioned in a potential gradient by controlling the voltage differential across two grids. A potentiometer controls the voltage differential across the grid.

A flow of air is produced through the plenum chamber between the two charged grids to carry the droplets from the chamber into a connecting duct which delivers the droplets into a collection tank. The collection of the charged droplets is enhanced by a like charged grid disposed at the top of the collection plenum to repel the droplets downwardly and also an oppositely charged attraction grid disposed along the bottom of the plenum and across the top of the collection tank. Water is drawn off to be used directly as low saline water or can be further processed using a Reverse Osmosis (RO) or Electrodialysis Desalinatin (ED) system. Any water vapor produced through the association of a humidification process can be captured by a dehumidifier which condenses out product water of very low saline content.

DRAWINGS

FIG. 1 is a diagrammatic view of the salt removal system embodying the invention; and, FIG. 2 is a diagrammatic view of the RO system for final desalination treatment of the low-salt content for the final desalination treatment.

DETAILED DESCRIPTION OF THE PREFERRED EMBODIMENT

Figure 1:
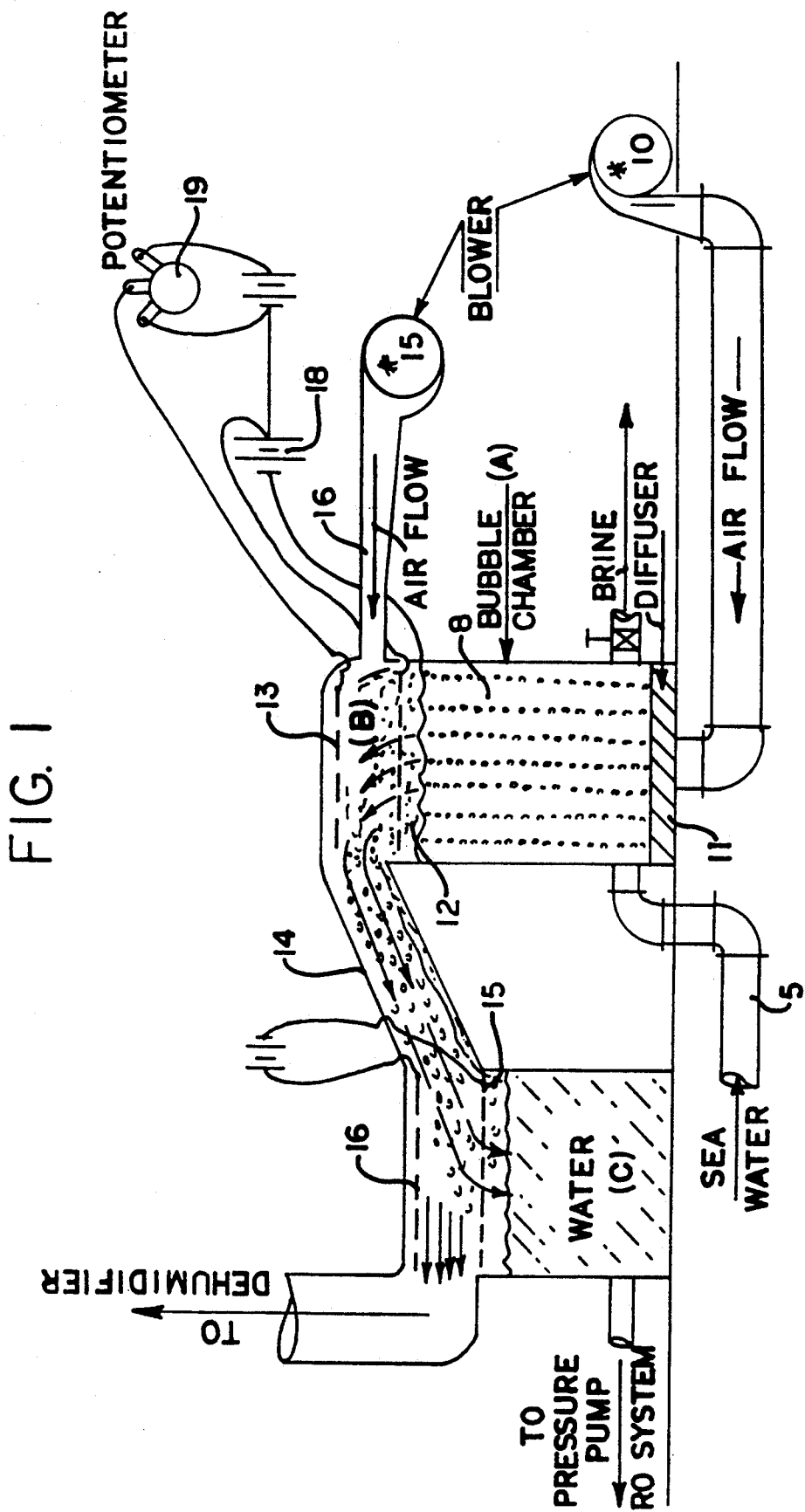

Apparatus embodying this invention includes a bubble chamber A through which water containing an undesirable quantity of salt such as sea water is supplied to the bubble chamber A through a supply conduit 5 having a control valve 5a. The salt water is maintained at the desired level within the chamber A by a by valve 5a and a discharge conduit 6 with a control valve 7. The valves 5a and 7 are adjusted to maintain the desired salt water level within the chamber A.

A supply of air bubbles 8 :s discharged into the bottom of the chamber A by a blower 10 which supplies air through a diffuser panel 11 in the bottom of the chamber A. The air is encapsulated within a film and forms the bubbles 8 which travel upwardly through the salt water in the chamber A and when they reach the water surface they rupture and each bubble collapses and forms a series of small water droplets which are produced by the shattering of the thin liquid film surrounding the bubble. This rupturing of the air bubbles occurs at the surface of the salt water in chamber A. As each bubble reaches the surface of the salt water the rupturing of the thin liquid film generates a small vertical water jet that rises from the water surface and produces a series of droplets above the water surface. These droplets are divided into two separate families, one of which is identified as a "film drop" and the other as a "jet drop". All of these droplets are relatively stable and can be transported in an air stream flowing across the surface of the water in the bubble chamber A. This air stream is produced by a second blower 15 which delivers a flow of air through a duct 16 which discharges the air flow across the surface of the salt water in the chamber A. Each of these droplets has an electrical charge induced thereon when the bubbles collapse at the surface of the salt water supply in chamber A. These charged droplets are accelerated through a grid 12 having an electrostatic field imposed thereon by a suitable electrical source 18. A second grid is positioned above the chamber A and a potential gradient across chamber B is established by power source 18a and controlled by potentiometer 19. This second grid 13 is designed to suspend the charged droplets passing up through the lower grid 12 to increase the density of the droplets in the upper portion of the air flow chamber B provided above salt water chamber A. The air flow through the chamber B carries the droplets through a transfer duct 14 to the open top of a collection tank C and are attracted downwardly into the open top of the tank C by a charged grid 17 which carries a charge opposite to the charge carried by the droplets being discharged from the transfer duct 14. Another grid 17a is positioned in spaced relation above the grid 17 and has the same charge as the droplets in order to repel the droplets downwardly into the collection tank C through the grid 17.

Figure 2:
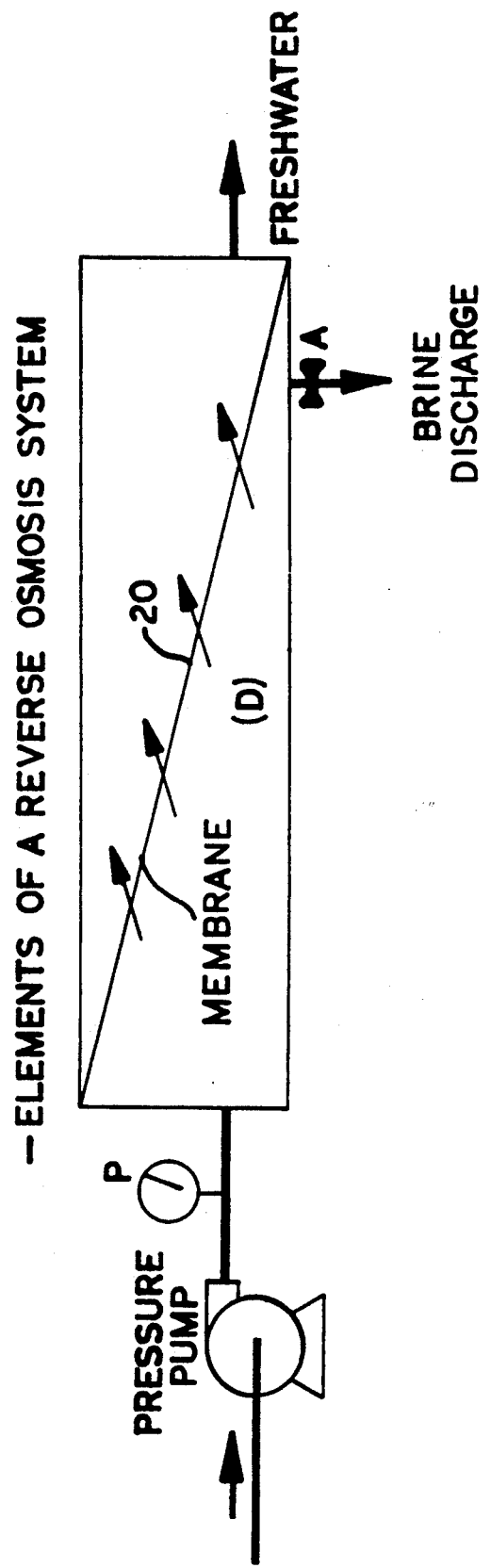

The water collected in the collection tank C contains substantially less salt than the sea water supplied through supply conduit 5; however, the actual salt content therein may still not be acceptable for specific applications. For this reason the water accumulated in the collection tank C is pumped to a salt removal system capable of producing an end product which is suitable for specific applications. Such a system is illustrated in FIG. 2 which shows diagrammatically a Reverse Osmosis (RO) system having a liquid confining chamber D with a separate membrane 20 extending thereacross. With an RO system as shown in FIG. 2, permeable membrane is typically subjected to pressures of 200 to 500 lb/sq in for brackish water. "Pure" water will diffuse through the membrane leaving behind a more salty concentrate containing most of the dissolved organic and inorganic contaminants. Brackish water RO plants typically recover 50 to 80 percent of the feed water, with 90 to 98 percent salt rejection. RO membranes are manufactured commonly in the form of hollow, hair-like fibers, or several alternating layers of flat-sheet membranes and open "spacer" fabric which is rolled into a spiral configuration. Membrane selection depends largely on feed water characteristics and membrane costs. (See page 11, March 1988 publication OTA-BP-O-46 of the Office of Technology Assessments by the U.S. Government, entitled "Using Desalination Technologies for Water Treatment".) The salt removal process in an RO system is well known and is not a part of applicant's invention. The discharge of air across the top of the collection tank C will carry some droplets which are passed through a transfer conduit 20. A dehumidifier of conventional design may be used for removal of the moisture content in this discharge and recover the desalinated water therefrom.

What is claimed is:

1. A water desalination method comprising
providing a supply tank with salt water contained therein,
discharging bubbles of air upwardly through the salt water in the tank whereby the film surrounding each bubble will rupture as it passes through the top surface of the liquid in the supply tank to produce low salt content water droplets having an electrical charge inherently formed thereon,
providing an electrostatic field above the surface of the salt water in the tank through which the droplets may pass,
imposing a potential gradient above the surface of the liquid in the tank to move the droplets upwardly away from the surface of the supply water,
providing a collection tank,
imposing a crossflow of air supplied by a blower on the droplets discharged above the grid to transport said droplets into the collection tank.

2. The method set forth in claim 1, and providing an electrostatic attraction field spaced above the salt water surface in the supply chamber and imposing by means of said potential gradient an attraction force on the droplets being discharged from the surface of the salt water in the supply tank.

3. The method set forth in claim 1, and providing an electrical attraction field adjacent the top of the collection tank to divert the droplets carried by the air crossflow downwardly into the collection tank.

4. The method set forth in claim 1, and producing a droplet repelling field in spaced relation above the collection tank to aid in diverting the droplets downwardly into the collection tank.

5. The method set forth in claim 1, and collecting a substantial portion of the droplets carried beyond the collection tank, and removing additional salt content from the collected droplets.

6. The method set forth in claim 1, and removing substantially all of the saline content remaining in the liquid collected in the collection tank.

7. Apparatus for the desalination of salt water, comprising,
a supply tank for containing salt water,
means for discharging air bubbles into the bottom of the tank in a substantially uniformly distributed pattern horizontally across the area thereof whereby said bubbles pass upwardly through the salt water in the tank and accumulate salt and disintegrate into electrostatically charged droplets when they pass upwardly through the surface of the salt water in the tank,
a first grid extending across the top of the tank above the level of the salt water therein,
means for imposing an electrostatic field in said grid to accelerate the droplets as they are discharged from the surface of the salt water in the tank,
blower means producing crossflow of air across the top of the tank to carry off the droplets, and
a collection tank for collecting the droplets transported by said air flow.

8. The structure set forth in claim 7 and a second grid spaced above the supply tank and means for imposing an electrostatic field upon said second grid to attract the droplets as they are discharged through the first grid.

9. The structure set forth in claim 7 and a grid disposed in spaced relationship above the collection tank and positioned in the upper portion of said air flow, and means for imposing an electrostatic field on the droplets being carried by the crossflow of air above the collection tank to repel the droplets downwardly into the collection tank.

10. The structure set forth in claim 7 and a grid extending across the top of the collection tank in close association therewith, and means for imposing an electrostatic field on said collection tank grid for attracting the droplets carried by the air crossflow.

* * * * *